Dec. 26, 1961 G. W. FEIL, JR 3,014,681
MOTOR VEHICLE EXHAUST MUFFLER SUPPORT MEANS
Original Filed Aug. 19, 1955
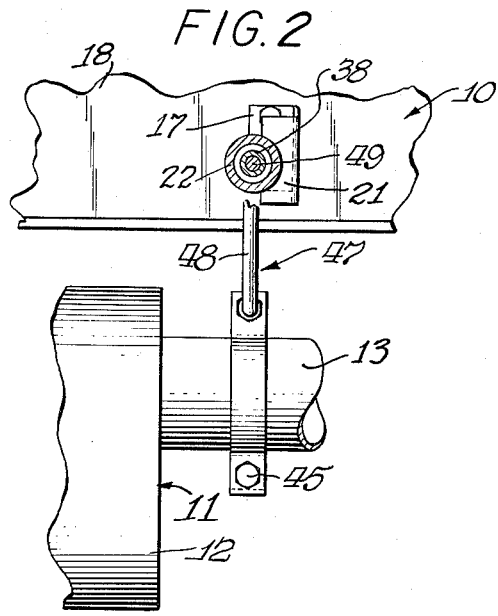
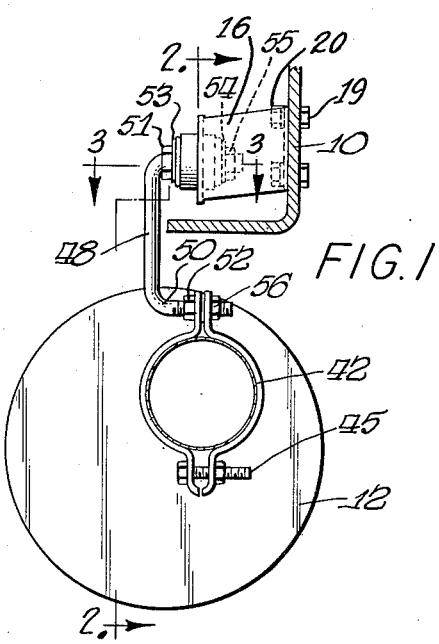
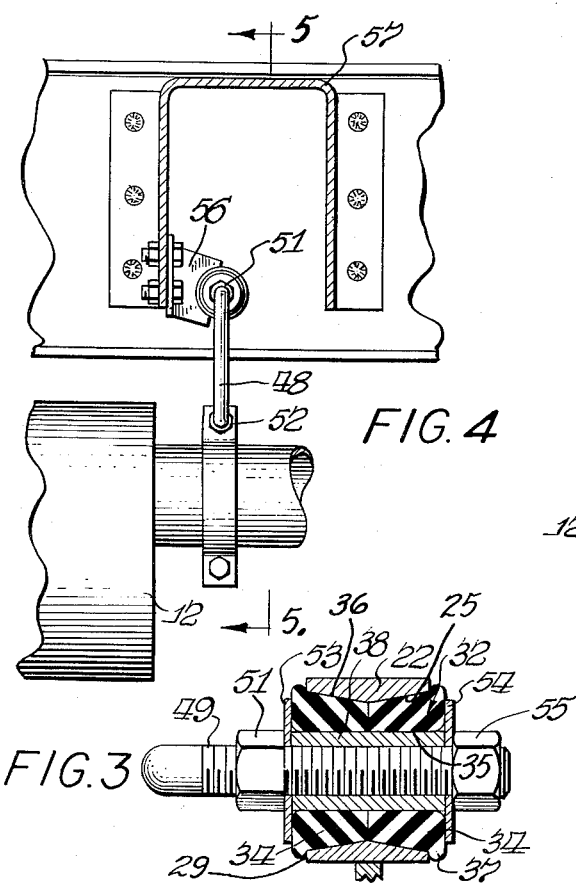
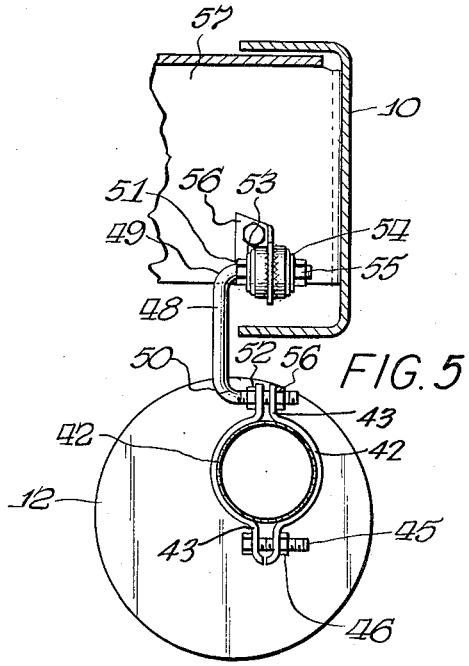
INVENTOR
GEORGE W FEIL JR
Paul O. Pippel
ATTORNEY

United States Patent Office 3,014,681
Patented Dec. 26, 1961

3,014,681
MOTOR VEHICLE EXHAUST MUFFLER
SUPPORT MEANS
George W. Feil, Jr., Fort Wayne, Ind., assignor to International Harvester Company, a corporation of New Jersey
Original application Aug. 19, 1955, Ser. No. 529,499, now Patent No. 2,912,198, dated Nov. 10, 1959. Divided and this application July 16, 1959, Ser. No. 827,664
9 Claims. (Cl. 248—60)

This invention relates to motor vehicles adapted to derive propulsion power from internal combustion engines and more particularly to a unique supporting means for an internal combustion engine muffler for such a vehicle. The present application is a division of applicant's copending application Serial No. 529,499, filed August 19, 1955, now Patent No. 2,912,198, for Motor Vehicle Exhaust Muffler Support Means and is assigned to the assignee of the aforementioned copending patent application.

Because of the unbalance of moving parts, unequal power impulses, combustion roughness and engine torque reactions, reciprocating piston-type motor vehicle internal combustion engines are subjected to vibratory forces tending to oscillate the engine when operating. Thus, in most installations, the engine is mounted on the vehicle chassis frame in such a manner that it is free to oscillate relatively to the frame in all directions to prevent the transmission of such vibratory forces to the chassis frame. The mounting means employed generally offer a resilient restraint against excessive relative movement between the chassis frame and the engine and cushion the vibratory forces. An exhaust pipe which extends from the engine to a point where it is desirous of expelling exhaust gases to the atmosphere includes a muffler and since one end of the exhaust pipe is rigidly connected to the exhaust manifold of the engine, it is obvious that the oscillating movement of the engine is transmitted to the exhaust pipe, including the muffler, tending to move it relatively to the frame. Furthermore, as the engine as well as the exhaust pipe is heated and cooled periodically as when the engine is in operation and when stopped, the exhaust pipe tends to expand and contract longitudinally in accordance with such change of temperature with respect to the chassis frame. Difficulty has also been experienced in the past in providing supporting means for the exhaust pipe of a motor vehicle which will function to insulate the exhaust pipe so that the exhaust noises therein will not be transmitted to the vehicle frame. It is, therefore, an important object of the present invention to provide a relatively simple and inexpensive but sturdy supporting means for mounting the muffler on the chassis frame which will positively secure the muffler in assembled relation with the frame and insure against accidental disengagement of the muffler from the frame but which will permit the muffler to move longitudinally with respect to the frame to compensate for changes in temperature thereof and to a limited degree in a transverse direction to permit relatively free movement of the muffler with respect to the frame due to oscillation of the engine when operating.

Another object of the invention is to provide means for connecting the muffler to the chassis frame which connections are effective to insulate the muffler from metallic contact with the frame whereby the noises developed within the muffler are prevented from being transmitted to the frame.

Another object of the present invention is to provide an improved flexible mounting for the muffler of a resiliently mounted vehicle engine which permits the muffler and pipes communicating therewith to move freely in unison with the engine with respect to the chassis frame.

A still further object is the provision of a flexible supporting means for an engine exhaust muffler which will flex sufficiently to permit the muffler and exhaust pipe to move longitudinally with respect to the chassis frame upon changes in temperature thereof as well as to permit limited flexibility in a transverse direction whereby the engine and exhaust muffler can oscillate transversely with respect to the chassis frame, which means also acts as a sound insulator whereby the exhaust noises developed within the exhaust muffler are not transmitted to the chassis frame.

Still another object is to provide unique novel means for mounting the muffler upon the vehicle frame which means afford sufficient flexibility in all directions to permit relatively free displacement of the muffler with respect to the frame and at the same time positively connecting the muffler to the vehicle so as to prevent any possibility of the muffler being detached from the frame even though the flexible means should fail.

The foregoing and other important objects and desirable features inherent in and encompassed by the invention, together with many of the purposes and uses thereof, will become readily apparent from a reading of the ensuing description in conjunction with the annexed drawings, in which:

FIGURE 1 is an end elevational view of a support means embodying the invention;

FIGURE 2 is a sectional view taken substantially along line 2—2 of FIGURE 1;

FIGURE 3 is a sectional view taken substantially along line 3—3 of FIGURE 1;

FIGURE 4 is a side elevational view of a modified form of bracket means; and

FIGURE 5 is a view taken substantially along line 5—5 of FIGURE 4.

Referring to the drawings in detail, wherein like reference characters represent like elements throughout the various views, there is shown a portion of a longitudinal side sill member 10 of a motor vehicle frame. Disposed generally below the side sill member 10 is an engine exhaust assembly designated in its entirety by numeral 11. The engine exhaust assembly includes a sound absorbing muffler or silencer 12 operatively connected at its rear or discharge end to a tail pipe 13. The forward or inlet end of the muffler 12 is similarly operatively connected to one end of a manifold exhaust pipe (not shown) which has its opposite end rigidly connected to the engine exhaust manifold (not shown).

The vehicle power plant or engine (not shown) is supported on the vehicle frame in a conventional manner wherein limited oscillating or rocking movement of the engine with respect to the side sill member 10 is permitted to compensate for the vibratory forces developed by the engine when operated. It will be appreciated that since the exhaust assembly 11 is rigidly connected to the engine, the rocking movement of the engine is imparted thereto. Furthermore, the exhaust assembly 11 is subjected to the heat of the exhaust gases flowing therethrough as well as atmospheric conditions and as a result either elongates or contacts with respect to the chassis frame. Thus the mounting means to be described hereinafter in detail for the exhaust assembly 11 are designed to permit relatively unrestrained displacement of the assembly 11 in a transverse direction with respect to the chassis frame to compensate for the rocking movement of the engine as well as lengthening and shortening of the assembly in a longitudinal direction with respect to the chassis frame to accommodate elongation or contraction due to the differences in temperature between the chassis frame and the exhaust assembly 11 without subjecting the assembly 11 to damaging stresses and strains. While two support hangers are employed to interconnect the chassis frame and the exhaust assembly 11, only one such support hanger designated generally 47 is shown in FIGURE 1. The support hangers 47 are adapted to suspend the assembly 11 from the side sill member 10 and maintain the same in an operative position. The support hangers 47 are designed to accommodate the aforementioned relative movement between exhaust assembly 11 and the side sill member 10. The support hanger 47 includes a C-shaped bracket 16 having one leg 17 thereof secured to the web 18 of side sill member 10 by means of a plurality of bolts 19 and cooperating lock nuts 20. The bracket 16 extends transversely inwardly with respect to the side sill member 10 and the terminal end thereof is defined by a leg 21 disposed in a plane substantially parallel to the web 18. A sleeve-like bearing member 22 extends through the leg 21 so as to have portions thereof on each side of the leg 21 and is rigidly secured thereto by any suitable means such as welding. The axis of the bearing member 22 extends transversely and is disposed substantially perpendicular to a vertical plane containing web 18. The bore of the bearing member 22 is in the form of a pair of frustums of cones arranged with the small ends of the frustums back-to-back and is defined by an inner surface 25. Thus, the inner diameter of the bearing member 22 varies from a maximum at the ends thereof to a minimum in a plane intersecting the axis of the bore at right angles and spaced axially substantially midway between the ends of the bearing member 22.

The support hanger 47 includes a link formed of a substantially U-shaped rod 48. The upper leg 49, as well as a lower leg 50, is provided with threaded portions upon which are threaded nuts 51 and 52, respectively. A washer 53 is mounted on the upper leg 49 and is adapted to abut the nut 51. The outer diameter of the washer 53 is greater than the internal diameter of the mid-portion of the bore for a purpose which will be pointed out hereinafter. A resilient non-metallic bushing, designated generally by numeral 32 and made preferably of rubber material, is inserted within the bore of the bearing member 22. The bushing 32 includes a pair of bushing sections 33, 34, each of which has an inner cylindrical surface 35 and an outer frusto-conical surface 36. When in assembled relation the bushing sections 33, 34 are in such position that their smaller ends abut each other at substantially midway between the ends of the bore and the outer frusto-conical surfaces 36 of each section 33, 34 engage the inner surface 25 of the bearing member 22 snugly. The outer end of each bearing section 33, 34 is defined by an annular end flange 37 which is adapted to radially overlap a respective end face 29 of the bearing member 22. A metallic sleeve 38 extends through the bushing 32 and engages the inner cylindrical surfaces 35 throughout their length. The upper leg 49 extends through the sleeve 38 and a second washer 54 is mounted on the projecting end of the upper leg opposite the washer 53, as shown in FIGURE 3. A nut 55 is used to force the washers 53, 54 into engagement with the respective opposite ends of of the sleeve 38 and at the same time to force the washers 53, 54 tightly into frictional engagement with the end flanges 37 of the bushing 32. Because of the frusto-conical nature of the engaging surfaces of the bushing 32 and the bearing member 22, the axial force urging the washers 53, 54 toward each other by drawing up the lock nut 55 causes the bushing 32 to be tightly wedged into frictional engagement with the inner surface 25 of the bearing member 22, which results in a substantially non-slipping bond between the bushing 32, bearing member 22 and the sleeve 38. Similarly the end flanges 37 of the bushing 32 are compressed between a respective washer 53, 54 and an adjacent end face 29 of the bearing member 22.

From the foregoing it will be seen that a connection between the vehicle chassis frame and the U-shaped rod 48 is provided which functions similarly to a universal joint since the rod 48 is capable of rocking about the longitudinal axis of the bearing member 22 with respect to the chassis frame as well as moving angularly with respect thereto about an axis intersecting and perpendicular to such longitudinal axis of the bearing member 38. Relative rocking movement between the rod 48 with respect to the bearing member 22 about an axis perpendicular to the longitudinal axis of the bearing member is afforded by compression of the rubber bushing 32. Furthermore, such relative movement between rod 48 and the chassis frame is accomplished without slipping of any surface upon the other and thus substantially all wear between the relatively movable parts is eliminated. Furthermore, since the bushing 32 is initially under compression when assembled, as shown in FIGURE 3, it exerts a sufficient pressure upon the sleeve 38, washers 53, 54 and bearing member 22 to prevent excessive rattling of these parts after long periods of use. It will also be apparent that because of the frusto-conical nature of the mating surfaces of the bushing 32 and the bearing member 22, the forces of compression applied to the bushing to distort the same when the rod 48 moves angularly with respect to the bearing member 22 about a horizontal axis perpendicular to the longitudinal axis of the bearing member 22 are directed normally to the surfaces 36 of the bushing 32 and consequently there will not be an appreciable distortion of the bushing 32 as in the case of installations employing flexible bushings having cylindrical inner and outer surfaces. It will also be appreciated that the rubber bushing 32 is effective to insulate the rod 48 from metallic contact with the bearing member 22 whereby any noises developed within the muffler and which are transmitted to the rod 48 are prevented from being transmitted to the frame.

A pair of semi-cylindrical clamping elements 42 are provided which substantially encircle a cylindrical portion of the engine exhaust assembly 11. The ends 43 of each clamping element 42 are bent radially outwardly and each end 43 is provided with an aperture. The lower leg 50 is adapted to extend through an aperture of an end 43 of each clamping element 42. A nut 56 is adapted to be threaded on the lower leg 50 and maintain the upper ends 43 of the clamping elements 42 relatively close together in assembly but insufficient to prevent relative pivotal movement of the clamping elements 42 with respect to the rod 48 about an axis extending through the lower end 50. A clamping bolt 45 and nut 46 are provided for forcing the clamping element ends 43 associated therewith toward each other to firmly grip the engine exhaust assembly portion encircled by the clamping elements 42. It is to be understood that the axis of the lower leg 50 is spaced from and substantially parallel to the axis of the upper leg 49.

It will be appreciated that inasmuch as the washers 53 and 54 of the strap hanger support 47 disposed on opposite sides of the bushing 32 have outer diameters greater than the inner diameter of the mid-section of the bore it is impossible for the muffler assembly 11 to become disengaged from the chassis frame in the event the rubber bushing 32 should become dislodged or fail in use since the washers 53 and 54 are incapable of passing through the bore. Furthermore, since the muffler 12 is supported by a pair of support hangers 47 which are the same size and identical in construction the muffler assembly 11 is permitted to move longitudinally with respect to the chassis frame, which movement is accommodated by simultaneous relative pivotal movement of each rod 48 with respect to its associated bearing member 22 and clamping elements 42. Also, the muffler assembly 11 is capable of moving angularly about a longitudinally extending axis perpendicular to the axes of the bearing members 22 by compressional distortion of the rubber bushings 32.

In certain installations, because of space limitations, an L-shaped bracket 56 secured to the chassis cross member 57 may be employed in lieu of the C-shaped bracket 16, as shown in FIGURES 4 and 5.

From the foregoing it will be appreciated that the support hanger provides an improved means for mounting a muffler assembly upon a chassis frame which allows the muffler assembly to move freely both longitudinally and transversely of the vehicle but which affords the required sturdiness and stability to withstand the severe usage to which such an assembly is exposed.

The embodiment of the invention chosen for the purposes of description and illustration herein is that preferred for achieving the objects of the invention and developing the utility thereof in the most desirable manner, due regard being had to existing factors of economy, simplicity of design and construction, production methods and the improvement sought to be effected. It will be appreciated, therefore, that the particular structural and functional aspects emphasized herein are not intended to exclude but rather to suggest such other modifications and adaptations of the invention as fall within the spirit and scope of the invention as defined in the appended claims.

What is claimed is:

1. A motor vehicle muffler support hanger including detachable clamping means adapted to embrace a motor vehicle muffler cylindrical end section including a pair of semi-cylindrical clamping elements having oppositely directed radially extending tabs, a tab of each of said clamping elements adapted to lie closely adjacent a respective tab of the other of said clamping element; a sleeve-like bearing element adapted to be carried by the motor vehicle chassis frame, said bearing element being adapted to extend transversely with respect to the frame; a link having a substantially U-shape, said link having a pair of spaced and substantially parallel integrally formed legs one of said legs extending through said bearing element and the other of said legs extending transversely through a pair of said clamping element tabs whereby said clamping elements are pivotally connected to said link; said other of said legs being a part of said clamp operating means, said link legs being externally threaded; rubber bushing means encircling one of said legs within said bearing element, the ends of said bushing means extending beyond the respective opposite ends of said bearing element; a pair of washers on said one leg extending through said bearing element at opposite sides of said rubber bushing means; a spacer sleeve on said leg within said rubber bushing between said washers; and means cooperating with said one leg extending through said rubber bushing means for clamping said washers, spacer sleeve and bearing element into non-slipping frictional engagement with said rubber bushing means.

2. A motor vehicle muffler support hanger as set forth in claim 1, in which, said washers have outer diameters greater than the minimum internal diameter of said bearing element for maintaining the muffler in assembled relation with the chassis frame in the event of failure of said rubber bushing means.

3. A motor vehicle muffler support hanger as set forth in claim 2, wherein an end portion of said one leg extending through said rubber bushing means is provided with screw threads, and said means cooperating with said one leg for clamping said washers, spacer sleeve and bearing element into non-slipping frictional engagement with said rubber bushing means, includes lock nut means threaded on said threaded end portion of said one leg.

4. In a motor vehicle substantially as set forth in claim 2, in which, the inner wall surface of said bearing element engaged by said rubber bushing means is in the form of a pair of frusto-conical surfaces whereby the inner diameter of said bearing element varies from a minimum substantially midway between the ends of said bearing element to maximums at the ends thereof and said rubber bushing means includes a pair of abutting bushing sections each having an outer frusto-conical surface engaging substantially one-half of the interior wall surface of said bearing element.

5. A motor vehicle support hanger including a C-shaped bracket having a pair of legs adapted to be secured to the motor vehicle chassis frame and having a transversely extending sleeve-like bearing member secured to one leg of said bracket, a U-shaped rod, said rod having a pair of spaced and substantially parallel integrally formed legs, one leg of said U-shaped rod extending through said bearing member; rubber bushing means encircling the said one leg within said bearing member and frictionally engaging said one leg and the inner wall surface of said bearing member; means carried by and cooperating with said one leg for clamping said rubber bushing means, bearing member and said one leg into non-slipping frictional engagement; and clamping means adapted to embrace a muffler end section including a pair of semi-cylindrical clamping elements having oppositely directed radially extending end tabs, said clamping means including detachable means for pivotally connecting an end tab of each of said clamping element to said U-shape rod for pivotal movement about a substanitally horizontal axis spaced below and parallel to the axis of said leg of said rod extending through said bearing member, said detachable means including the other of said legs of said U-shaped rod and an element carried thereby, said element being movable with respect to said other of said legs along the longitudinal axis thereof to effect operation of said clamping means.

6. A motor vehicle muffler support hanger as set forth in claim 5, wherein an end portion of said one leg extending through said bearing member is provided with screw threads, and said means carried by and cooperating with said one leg for clamping said rubber bushing means bearing member and said one leg into non-slipping frictional engagement includes lock nut means threaded on said threaded end portion of said one leg.

7. In a motor vehicle substantially as set forth in claim 5, in which, the interior wall surface of said bearing member is in the form of a pair of frusto-conical surfaces arranged so that the internal diameter of said bearing member varies gradually from a maximum at the ends thereof to a minimum substantially midway between the ends thereof and said bushing means includes a pair of bushing sections, each of said bushing sections having an outer frusto-conical surface adapted to abut a portion of the interior surface of said bearing member.

8. A motor vehicle muffler support hanger including a U-shaped link, said link having a pair of spaced and substantially parallel integrally formed legs; flexible bushing means operably connected to one leg of said link and adapted to be operably connected to the motor vehicle chassis frame; a two-piece clamping means adapted to encircle an end section of the motor vehicle muffler; means for detachably interconnecting said link and said clamping means for relative pivotal movement about a substantially horizontal axis, said detachable interconnecting means including the other of said legs of said support link, an end portion of said other of said legs of said support means being provided with screw threads, said detachable interconnecting means further including a lock nut threaded on said threaded end portion of said other of said legs and being moveable with respect to said other of said legs for effecting operation of said clamping means.

9. A motor vehicle support hanger including a generally vertically disposed U-shaped link, said link having a pair of spaced and substantially parallel integrally formed legs; means adapted to connect one leg of said link to the motor vehicle chassis frame for universal movement with respect thereto; clamping means adapted to encircle an end of the motor vehicle muffler; and detachable interconnecting means including the other of said legs of said U-shaped link for pivotally connecting said link to said clamping means for relative pivotal movement about a substantially horizontal axis, said detachable interconnecting means including an element carried by said other of said legs and moveable axially along the longitudinal axis of said other of said legs in a particular direction to effect clamping action of said clamping means.

References Cited in the file of this patent

UNITED STATES PATENTS

| | | |
|---|---|---|
| 873,198 | Wilson | Dec. 10, 1907 |
| 1,805,006 | Neilon | May 12, 1931 |
| 2,112,914 | Leighton | Apr. 5, 1938 |